United States Patent [19]

Edwards

[11] E Re. 30,130

[45] Reissued Oct. 30, 1979

[54] LIQUID REACTION MOLDING PRESS

[75] Inventor: Bobbie L. Edwards, Cincinnati, Ohio

[73] Assignee: Cincinnati Milacron Inc., Cincinnati, Ohio

[21] Appl. No.: 929,685

[22] Filed: Jul. 31, 1978

Related U.S. Patent Documents

Reissue of:

[64] Patent No.: 3,981,671
Issued: Sep. 21, 1976
Appl. No.: 615,351
Filed: Sep. 22, 1975

[51] Int. Cl.[2] ..... B29C 5/00; B29D 27/04

[52] U.S. Cl. ..... 425/453; 425/4 R; 425/188; 425/195; 425/408; 425/450.1; 425/451.9; 249/170

[58] Field of Search ..... 425/4, 15, 26, 188, 425/193, 195, 406, 407, 408, 450.1, 451.9, 453; 249/170, 161

[56] References Cited

U.S. PATENT DOCUMENTS

| | | | |
|---|---|---|---|
| 2,496,771 | 2/1950 | Bolling | 425/406 |
| 2,696,021 | 12/1954 | Cox et al. | 425/26 |
| 2,812,543 | 11/1957 | Stacy | 425/406 |
| 3,142,093 | 7/1964 | Tribbett | 425/406 |
| 3,171,163 | 3/1965 | Ford et al. | 249/170 X |
| 3,200,438 | 8/1965 | McIlvin | 425/451.9 X |
| 3,419,648 | 12/1968 | Leach | 425/408 X |
| 3,663,139 | 5/1972 | Robbins et al. | 425/147 |
| 3,771,928 | 11/1973 | Goslyn et al. | 425/188 X |
| 3,816,044 | 6/1974 | Nielsen et al. | 425/406 X |
| 3,840,317 | 10/1974 | Koch et al. | 249/161 X |

FOREIGN PATENT DOCUMENTS 1679701 1/1954 Fed. Rep. of Germany .

*Primary Examiner*—J. Howard Flint, Jr.
*Attorney, Agent, or Firm*—Daniel P. Worth

[57] ABSTRACT

A clamp for holding together the portions of a mold used in molding solid objects from a reacting liquid such as polyurethane has a C-shaped frame which is pivotally mounted on a pedestal to swing through an arc. The C-shaped frame of the clamp consists of an integral structure having an upper jaw connected by a column to a lower jaw. The frame supports a bed, crown and platen. The bed and crown are each a plate-like member that is mounted to pivot relative to one of the jaws. The platen is mounted preferably on the bed or lower one of such members. The mold portions are mounted on the crown and platen with the parts being arranged to move so that the mold portion engage and disengage. The invention also includes a method of molding wherein the mold portions are engaged and disengaged by a process that involves pivoting at least one and preferably both of the portions relative to the C-shaped frame.

19 Claims, 8 Drawing Figures

LIQUID REACTION MOLDING PRESS

Matter enclosed in heavy brackets [ ] appears in the original patent but forms no part of this reissue specification; matter printed in italics indicates the additions made by reissue.

SUMMARY OF THE INVENTION

The present invention relates to an improved press or clamp for molding a solid object from a reacting liquid system. One aspect of the apparatus relates to a clamp having a C-shaped frame on which a bed and crown are pivotally mounted in positions substantially opposite each other on one of which is reciprocably mounted a movable platen. An aspect of the invention relates to apparatus having such a C-shaped frame with bed, crown, and platen thereon that is revolvably supported from a pedestal whereby the C-shaped frame with molds mounted thereon may be revolved to any of a variety of positions. An aspect relates to a mold apparatus wherein the mold is opened or closed by rotating the mold parts about respective axes. An aspect of the invention relates to an apparatus for the molding of a solid object from a chemically reacting liquid mixture such as the molding of a polyurethane article from a reacting mixture of polyol and isocyanate in connection with which and by way of illustration only the invention will be described.

BACKGROUND

Liquid reaction molding (also called Reaction injection molding or liquid injection molding hereinafter LRM or LIM) of solid polyurethane articles from a liquid mixture of polyol and isocyanate has become increasingly important as a means of molding large articles without going to the extremely high mold clamping pressures and forces required for ordinary injection molding. For example, for an automobile body part (rear or front fascia) weighing about 10–15 pounds, the liquid or reaction injection system uses mold closing forces and pressures of about 60 tons and about 100 psi. respectively, whereas injection from a plasticated mass of rubber or thermoplastic polymer of about the same weight may involve mold cavity pressures on the order of 8000 psi. and clamping force on the order of 3000 tons or greater.

The technical literature describes liquid or reaction injection molding. The January, 1975 edition of Plastics Engineering, pps. 25–29 describe a number of products being made by this technique as well as some of the systems. A number of U.S. patents describe components of such systems, e.g. U.S. Pat. No. 3,410,531 and 3,409,174.

It is sometimes desired to vent the mold of gases originally therein and to degas the reacting mixture before it solidifies. These are often accomplished by mold design and venting. Sometimes it is required to tip the mold in order to permit the gas bubbles to rise to a vent at the mold high point.

An objective is to present an embodiment of a clamp or press which can swing a mold thereby to vent it or otherwise to improve the LIM process.

The present trend toward molding large parts such as a complete automobile fender, bumper, or auto body front or rear end by liquid injection has generated a daylight requirement. Daylight is a trade term used to describe the space available for a molding to drop out of the mold. The amount of daylight is normally directly proportional to the size of the press or clamp in which the mold parts are mounted. Where large parts such as those mentioned are to be made by liquid injection molding a large daylight requirement results which ordinarily would require a high tonnage large clamp.

Accordingly, an objective of the present invention includes providing an apparatus for liquid injection molding. A LIM apparatus having large daylight is an objective also.

The large daylight requirement for LIM as well as the need to mount and demount large molds (some weigh 10 to 15 tons) are incompatible with the tie rod type of construction typically used in conventional injection molding machines. The present invention features a C-frame in which mold parts are pivotally mounted. This structure eliminates tie rods, increases daylight, enhances access to the mold (no hands in the die), facilitates mold mounting, and maintains mold alignment despite deflection of parts of the C-frame.

The moving of a mold or rather of the closed mold around a path is, broadly speaking, already known. It is known for example to move closed molds or the components thereof through horizontal and vertical circular paths, these being nicknamed merry-go-round and ferris wheel arrangements. U.S. Pat. No. 3,663,139 illustrates a representative merry-go-round.

The invention therefore relates to a clamp for mounting mating parts of a mold in the mold cavity of which may be reacted an organic liquid molding to form a solid molded object comprising a C-shaped frame assembly having a lower jaw connected by a column to an upper jaw; a mold support (crown) pivotally mounted on the upper jaw of said frame assembly; a pedestal and floor plate assembly; means revolvably supporting said C-shaped frame assembly from said pedestal and floor plate assembly; a mold bed support (bed) pivotally mounted on the lower jaw of said frame assembly; the pivotal mounting means for said crown and bed being located on parallel axes; and a movable platen reciprocably mounted on one of said bed and said crown; said crown and said movable platen being adapted to support thereon respective parts of said mold and positionable so that the mold is closed when the crown and platen are substantially parallel and said platen advanced to where the mold parts are engaged and said mold is opened by retracting said platen and pivotally swinging both said base and crown away from the column portion of said frame assembly.

Other objects, advantages and features will become apparent from the following specification when read in conjunction with the attached drawings wherein.

Figure 5:
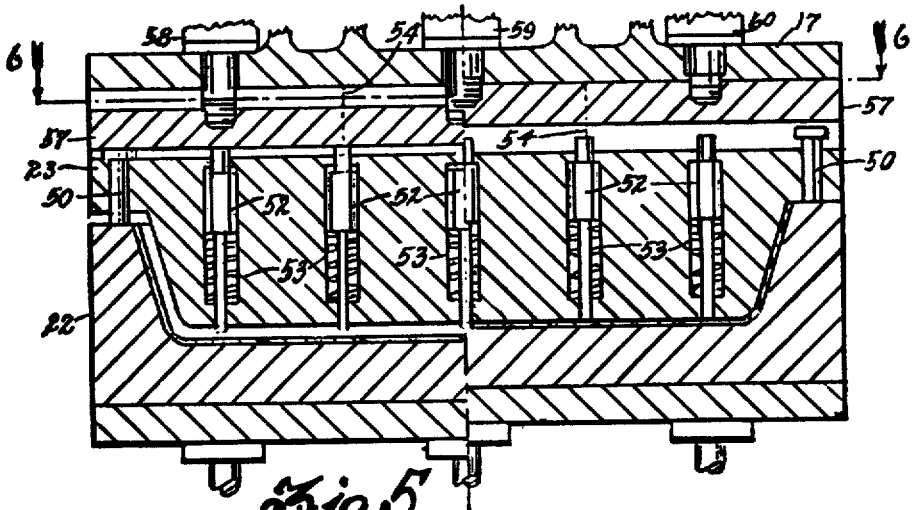
Figure 6:
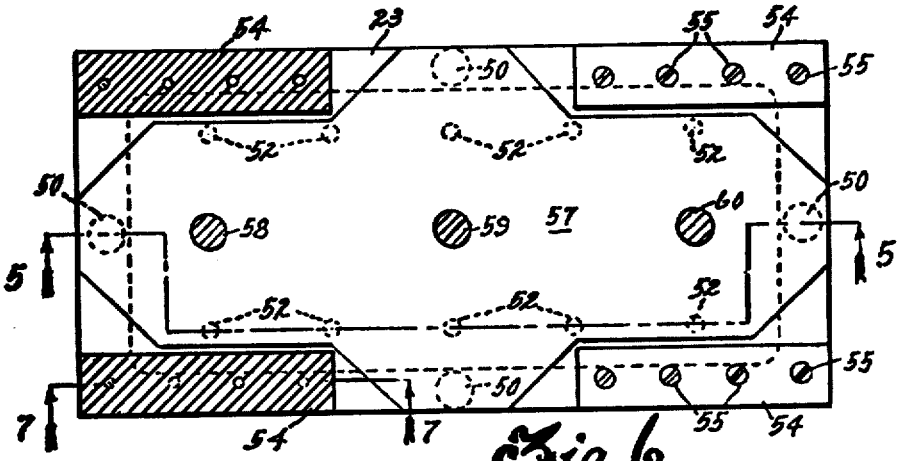
Figure 7:
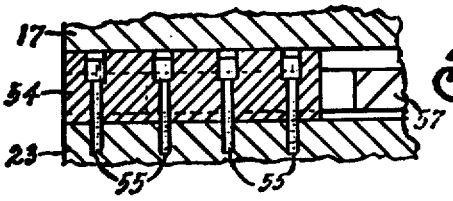

FIGS. 5 and 6 are front section and top section views of a mold and its opening means on the press as seen along sections 5—5 are 6—6 of the other figure, respectively, wherein FIG. 5 illustrates a closed mold on its right half and an initially opened mold on its left half;

FIG. 7 is a partial front section view of a mold along 7—7 of FIG. 6; and

Figure 8:
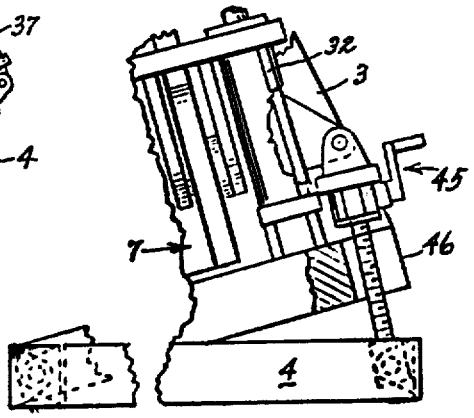
Figure 3:
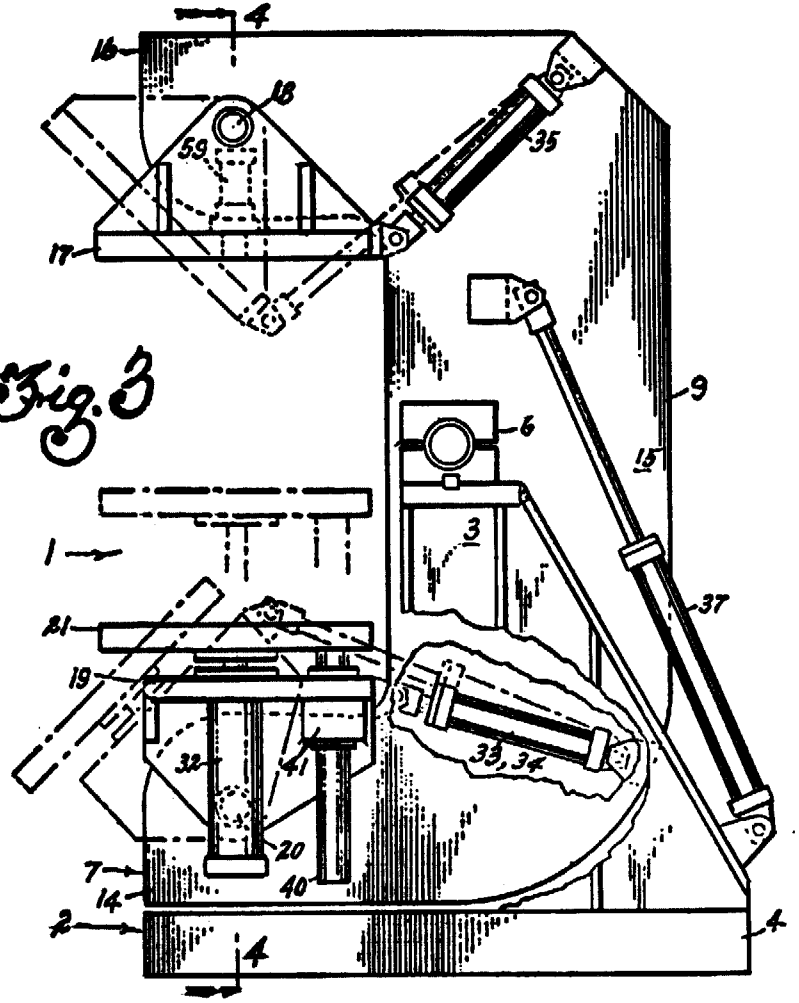
FIG. 3 is a side view of the press with no mold parts mounted in it and the crown, base, and platen in solid line and also showing in ghost lines the extreme position to which the crown base and platen can be moved.
Figure 4:
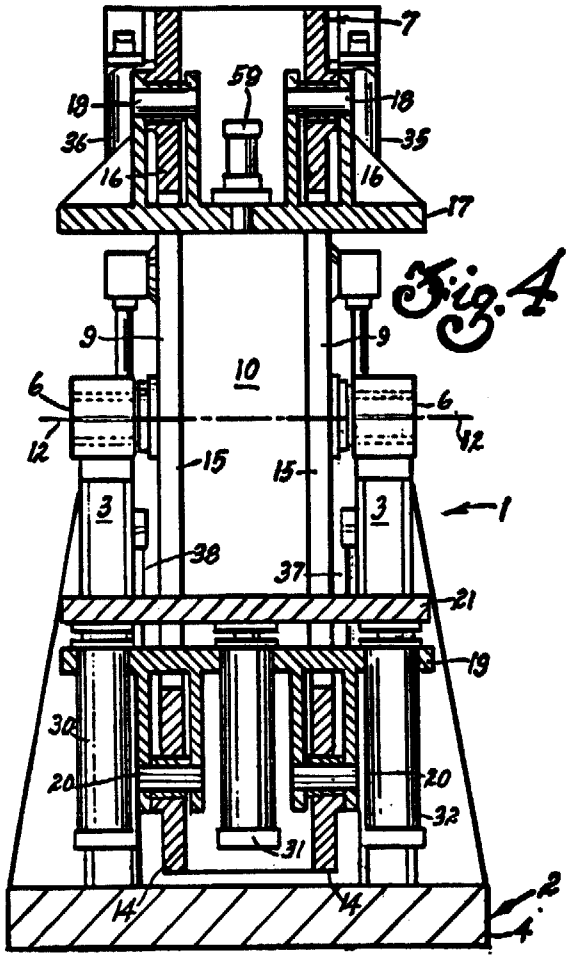
FIG. 4 is the front section view along 4—4 of FIG. 3.

FIG. 8 illustrates a modified press as seen in a partial front view.

Referring now to the drawings but most particularly FIGS. 1-4 there is shown a clamp 1 according to the invention which includes a pedestal and floor plate assembly 2 that includes a pair of spaced apart vertical supports 3,3 of approximately triangular shape which are welded at their lower ends to a floor plate 4. At the upper end of each support 3 is a trunion or journal bearing 6,6 which supplies a means from which the C-shaped frame assembly 7 is revolvably supported between the two pedestals.

The C-shaped frame assembly 7 has a pair of C-shaped side members 9,9 supported in spaced apart relationship by a plurality of cross plates or pieces 10,10 (FIG. 4 only) extending laterally of the machine and generally parallel to the axis 12 common to the aforesaid trunions. Each side member 9 has a lower jaw 14 connected by a column 15 to an upper jaw 16. A mold crown 17 (swinging platen) is pivotally mounted by journal bearings 18 to the upper jaw 16 of said frame assembly. A mold bed 19 is pivotally mounted by journal 20 on the lower jaw 14 of the frame assembly. A movable platen 21 is reciprocably mounted on one of said bed or crown, preferably (as illustrated) on the bed. Journal bearings 18 and 20 preferably have substantially parallel axes.

Mold segments 22,23 are secured to the platen 21 and crown 17 in such a manner as to properly engage each other when the molds are closed. The supports 3 and C-frame 7 are shaped so that the molds 22,23 are not obstructed by the supports or other parts of the base assembly 2.

A plurality of independently operated power means 30 . . . 38 are provided to move the different parts of the clamp. Preferably, these power means are double acting hydraulic piston and cylinder assemblies. The power means can be operated individually by the operator or alternatively the hydraulic liquid circuit can be provided with appropriate means to permit automatically operating the clamp through its sequence.

A plurality of hydraulic clamping cylinders 30,31,32 are secured to the bed 19 and act as power means for reciprocating the movable platen 21 relative to the bed, the pistons being connected to the platen. The alignment of the platen with the bed is maintained during reciprocation by a plurality of platen guide rods 40 which are fixedly secured to the platen and slide in corresponding bearings 41 in the bed.

The bed and crown are revolved relative to the C-shaped frame assembly by pairs of hydraulic cylinders 33,34 and 35,36. The crown is revolved between the extreme position shown in solid and ghost lines of FIG. 3 by a pair of crown hydraulic cylinders 35,36 which are pivotally secured to the C-frame assembly and to the inner edge of the crown. The bed 19 (on which is mounted the movable platen 21 and lower mold half) is revolved between the FIG. 3 extremes by a pair of bed hydraulic cylinders 33,34 which are pivotally connected to the C-frame and to the inner edge of the bed.

Figure 1:
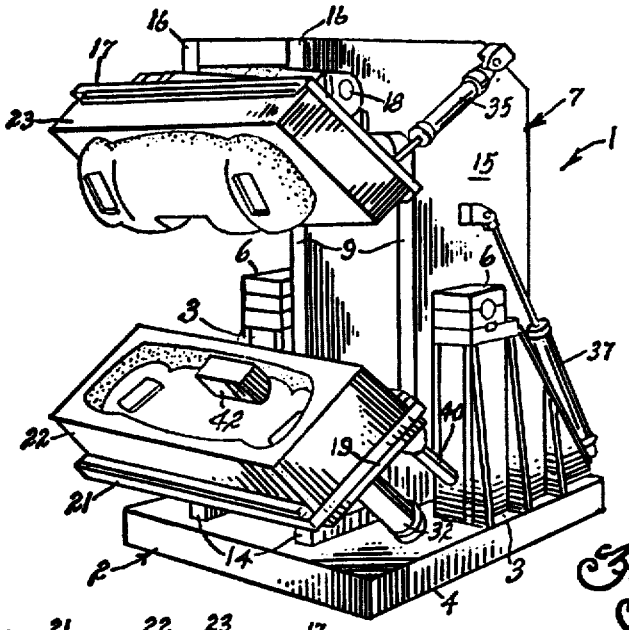
FIG. 1 is a perspective view of a press or clamp with the mold open.
Figure 2:
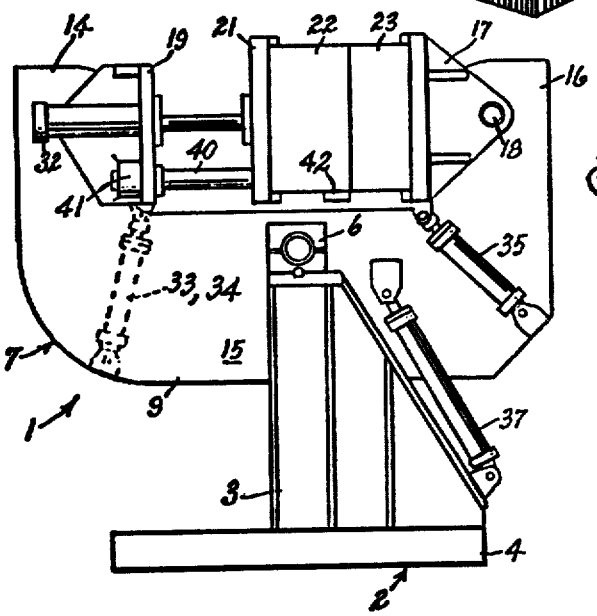
FIG. 2 is a side view of a closed mold which has been tipped or swung through an angle of 90°.

The C-shaped frame assembly 7 is tipped or moved from the FIG. 1 to FIG. 2 position through a 90° arc by a pair of pedestal hydraulic cylinders 37,38 each of which is mounted pivotally at each end to the pedestal assembly and the frame assembly 7, respectively. Preferably, the vertical support plates of the pedestal are sloped or cut along their rear edge to accommodate the pedestal hydraulic cylinders. The pedestal cylinders—actually the piston thereof as illustrated—are pivotally connected to a place on the frame assembly selected so that the amount of cylinder force required is minimized in view of the moment arm and force applied by the pedestal cylinders and the counteracting center of gravity and moment arm of the frame assembly and mold.

The arrangement shown, with the moving platen 21 attached to the lower bed 19 provides a desirable safety feature whereby the platen falls open in response to the loss of mold closing force thereby achieving a fail-safe feature. For example, the loss of hydraulic liquid pressure would permit the platen to fall open against the bed so long as the platen is mounted on the lower one of the bed or crown.

The aforementioned pairs of hydraulic cylinders 33 . . . 38 for the bed, crown and C-frame assembly are symmetrically mounted in the manner described above and illustrated in the figures. In each pair there is a cylinder on the left side of the machine 1 and one on the right side of the machine 1.

An injection means assembly 42 (FIG. 1) is secured preferably to the lower mold half 22 so that it injects along the parting line of the mold. This allows runners and gates to be formed in both the upper and lower molds, facilitates parting, and makes it much easier to remove the molded article once the same has been cured or cooled to a solid condition.

FIG. 8 shows a modified version of the above-described clamp means which can be laterally tipped from the vertical by use of a screw jack 45 connected between the floor plate 4 and a base assembly 46 to which the pedestals are welded. Use of this modification permits tipping the mold so that one part of it is at the greatest elevation and thus may be degassed more readily. Often times, however, such a tipping technique is not needed, hence this is an optional feature. Tipping the C-frame 7 to the position shown in FIG. 2 by operation of the pedestal cylinders may often provide sufficient mold elevation to obtain the amount of degassing of the liquid mold materials by the tipping technique. Of course, there may be occassions where no tipping at all to the positions of FIGS. 2 or 8 is needed. In such instances it will suffice to lock the mold portions closed and go through the cycle of injecting, curing, etc., in order to form a solid article from the liquid materials injected.

FIGS. 5, 6, and 7 illustrate some details of a mold mounting and system for parting and stripping the mold which include a plurality of mold strip pins 50 (not shown are bolts for mounting the mold); the part strip pins 52 and springs 53; mold spacer blocks 54 and mold spacer mounting bolts 55; the cruciform stripper plate 57; and a plurality of parting cylinders 58, 59 and 60 secured to stripper plate 57 for initially cracking the mold open after the material injected therein has cured sufficiently. In the interest of clarity, only one parting cylinder 59 is illustrated in FIGS. 1-4, the other two being omitted but FIG. 5 illustrates the additional parting cylinders 58, 60—it being understood that the number of parting cylinders—and the mold pins 50 and strip pins 52 as well—required and even their placement depends on the size and shape of the piece being molded.

The upper mold 23 is prepared with a plurality of bores in which are respectively received the mold and part strip pins 50, 52 and springs 53. The mold strip pins 50 have a head on one end to prevent their falling through the upper mold half 23, set loosely in the bore (a diametral clearance of 0.010 inches being preferred), and are longer than the mold is thick so that the mold parting function can take place when each pin engages the stripper plate.

The part strip pins 52 are preferably mounted loosely in their bores (a clearance as above is suggested); are longer than the mold is thick, have an enlarged center and reduced diameter ends to permit retaining the spring 53 at one end and to permit the other end to protrude above the mold (see FIG. 5), and preferably are retained within the mold by an internal spring such as e.g., sold under the trademark TRUARC.

The mold spacer blocks are mounted at each corner of the upper mold and secured fixedly between the crown 17 and the upper mold 23 as best illustrated in FIG. 7. Mounting bolts 55 are shown as securing the spacer blocks in this position, it being understood that the bolts 55 may be long enough when desired to secure together the mold, spacer block and crown 17.

The spacer block 54 is thicker than the stripper plate 57 whereby sufficient room is provided for the stripper plate to move up and down in the space between the crown and upper mold. The stripper plate can be moved between a mold closed position as shown the right half of FIG. 5 and a mold parting or cracked position when actuated by the parting cylinders 58, 59, 60 (mold opening means) as shown in the left half of FIG. 5.

The purpose of the spacer block and stripper plate structure is, as might be expected, to facilitate opening the mold and to apply the extra force realized from parting cylinders 58,59,60 to accomplish this. The molded part often provides an adhesive force which holds the mold halves together and makes parting difficult, even though mold release compositions and other means are employed to minimize adhesion. The operation of the parting cylinders 58–60 causes stripper plate 57 to first strike the heads of the mold strip pins 50 to crack apart the mold halves 22, 23. Preferably force is likewise applied by cylinders 30, 31 and 32 at the same time to enhance this opening action. As the stripper plate 57 is moved further down, it next contacts the heads of the stripper pins 52 and drives their lower ends down thereby releasing the part from the upper mold 23.

An advantage of the design to open the mold is that the mold separating force due to the parting cylinder(s), be there one (FIG. 4) or a plurality (as the three of FIGS. 5,6), is that the C-frame assembly 7 does not receive the force therefrom. As shown, C-frame 7 receives forces from clamping cylinders 30,31,32 to hold closed the mold parts 22,23 and to initially open them. In turn, this means that a much greater mold opening force (the sum of cylinder opening forces from 30,31,32 plus 58,59,60) can be provided without a strengthening the frame 7: e.g. if each cylinder 30,31,32 and 58,59,60 had a 25 ton mold opening force then the FIG. 5,6 arrangement applies 150 tons opening force to the mold 22,23 and the molded object while only applying 75 tons to the frame 7.

In reviewing a molding sequence, assume a clamp assembly with its start position as in FIG. 1. The crown and bed are at this time in the same position shown from the side in dotted lines in FIG. 3. The bed and crown hydraulic cylinders are operated to swing the bed, crown, platen and mold parts to the mold-aligning solid line position of FIG. 3. The platen hydraulic cylinders 30,31,32 are then actuated and the platen is moved up by a linear motion until the mold portions have engaged and become fully clamped together.

The bed and crown journal bearings 18,20 are situated along substantially parallel axes. The clamping force is actually achieved by the plural moving platen cylinders 30–32 which could with equal ease be called clamping cylinders. Only a modest clamping force is required because of the substantially lower force requirements of liquid reaction molding in contrast to standard injection molding. However, this arrangement of mold mounting means and clamping cylinders yields a unique advantage: the faces of the mold are able to stay engaged with each other whereby flash and/or liquid leakage from mold 22,23 is minimized. Arrangements which do not provide pivotal mounting might, in contrast, permit the mold parts to cock relative to each other due to deflection of the jaws in the C-frame assembly. Minimizing of this cocking and consequent flashing is one of the reasons standard injection molding machines have a tie rod assembly structure. The present C-frame assembly is able to serve by reason of this self-aligning feature which takes place regardless of the amount of deflection permitted by the frame.

To continue with describing the operation: once the mold portions 22,23 are closed, the C-frame assembly 7 is then moved to whatever position is desired. The illustrated construction permits revolving the same through as much as 90° to the position shown in FIG. 2.

(It is assumed that the tipping as shown in FIG. 8 had been permanently set in for a given run by adjusting the screw jack 45 prior to the present sequence being initiated).

A mixture of reacting liquids, e.g. isocyanate and polyol are then directed into the mixing head or injection means 42 which then injects the mixture in to the mold cavity. Curing of the liquid into a solid state occurs then next. This may be speeded up by directing temperature-controlled fluid (probably hot water) through the various mold parts for a predetermined time. After the mixture gels (usually a short time) the C-frame assembly may be returned to FIG. 3 position to finish curing (usually the longer time). When the curing phase is ended, the C-frame assembly is—if need be—returned from the FIG. 2 to the FIG. 3 position, the platen is retracted or moved toward the bed and then the bed 19 and crown 17 are each revolved to the dotted line positions shown in FIG. 3. At this point in time, the molded article is removed from the mold, preferably by suitable ejection means such as those described in FIGS. 5–7.

The hydraulic cylinders 30,31,32; 58,59, and 60; and 33 . . . 38 shown herein are preferably all double acting. They may be operated manually in the usual way, i.e. by using a four-way hydraulic valve to operate each cylinder. In the case of paired cylinders, 33 . . . 38 one four-way valve with flow dividing means downstream thereof (as is well-known) can be used for each pair (33,34; 35,36; 37,38) instead of two such valves thus insuring simultaneous fluid admission, exhaust, and cut-off of the paired cylinders. Preferably, only one motion at a time should be attempted i.e. the platen 21 should be raised or lowered, the bed and crown swing, and the C-frame 7 swing by their respective cylinders when no other hydraulic cylinders or motion is conducted. The bed and crown may less preferably be simultaneously swung about their axes if the hydraulic pump has sufficient capacity, otherwise they should each be operated alone—as the others are.

What is claimed is:

1. A clamp for mounting mating parts of a mold in the mold cavity of which may be reacted an organic liquid molding to form a solid molded object comprising:

a C-shaped frame assembly having a lower jaw connected by a column to an upper jaw;

a mold support (crown) pivotally mounted on the upper jaw of said frame assembly;

a pedestal and floor plate assembly;

means revolvably supporting said C-shaped frame assembly from said pedestal and floor plate assembly;

a mold bed support (bed) pivotally mounted on the lower jaw of said frame assembly;

pivotal mounting means for said crown and bed located on substantially parallel axes; and a movable platen rciprocably mounted on one of said bed and said crown;

said crown and said movable platen being adapted to support thereon respective parts of said mold and positionable so that the mold is closed when the crown and bed are substantially parallel and said platen has been advanced to where the mold parts are engaged and said mold is opened by retracting said platen and pivotally swinging both said bed and crown away from the column portion of said frame assembly.

2. A clamp according to claim 1, further including power means for reciprocating said movable platen relative to that one of said bed and said crown on which it is mounted.

3. A clamp assembly according to claim 1, further including power means for revolving said bed and crown relative to said frame assembly.

4. A clamp according to claim 1, further including said platen being reciprocably mounted on said bed and further including hydraulic cylinder power means mounted between said bed and movable platen for causing said reciprocal platen motion whereby loss of hydraulic pressure will cause the platen to drop open.

5. A clamp according to claim 4, further including mold opening means mounted on said clamp to apply an opening force to such portion of a mold as may be mounted on said platen.

6. A clamp according to claim 1 further including first and second portions of a mold mounted respectively on said bed and said crown.

7. A clamp according to claim 6, further including mold opening means mounted on said clamp to apply a mold opening force to said first mold portion.

8. A clamp according to claim 1, further comprising that said pedestal and floor plate assembly includes a pair of spaced-apart vertical support plates; and said frame assembly is supported by said means for revolvably supporting from and between said support plates.

9. A clamp according to claim 8, wherein said movable platen is reciprocably mounted on said bed whereby said platen may fall open in response to the loss of mold-closing force thus achieving a fail-safe feature.

10. A clamping means according to claim 9, further including:

a first power means for revolving said frame assembly from vertical to horizontal;

a second power means for reciprocating said movable platen relative to that one of said bed and said crown on which it is mounted; and third and fourth power means for revolving said bed and crown, respectively, relative to said lower and upper jaws.

11. A clamp according to claim 10, wherein second power means for reciprocating includes a hydraulic piston and cylinder secured to said bed with the platen moving portion being secured to said platen.

12. A clamp according to claim 10, further including mold opening means mounted on said clamp to apply an opening force to such portion of a mold as may be mounted on said platen.

13. A clamp according to claim 8, further comprising:

a first power means for revolving said frame assembly from vertical to horizontal and vice versa.

14. A clamp according to claim 8, further including power means for revolving said bed and crown, respectively, relative to said lower and upper jaws.

15. A clamp according to claim 14, further including first and second mold portions respectively mounted on said bed and crown, and mold opening means mounted on said clamp to apply a mold opening force to said first mold portion.

*16. A clamp for mounting mating parts of a mold in the mold cavity formed by which may be reacted an organic liquid molding to form a solid molded object comprising:*

*a C-shaped frame assembly having a lower jaw connected by a column to an upper jaw;*

*a mold support (crown) pivotally mounted on the upper jaw of said frame assembly;*

*crown power means connected between said frame and crown to pivot said crown relative to said frame;*

*a pedestal and floor plate assembly;*

*means revolvably supporting said C-shaped frame assembly from said pedestal and floor plate assembly;*

*a mold bed support (bed) pivotally mounted on the lower jaw of said frame assembly;*

*bed power means connected between said frame and bed to pivot said bed relative to said frame;*

*pivotal mounting means for said crown and bed located on substantially parallel axes;*

*a movable platen reciprocably mounted on said bed; and*

*platen power means mounted between said bed and movable platen for reciprocation of said platen;*

*said movable platen and said crown being adapted to support thereon respective parts of said mold and positionable so that the mold is closed and mold cavity formed when the crown and bed are substantially parallel and said platen has been advanced to where the mating mold parts are engaged.*

*17. A clamp according to claim 16 further including first and second portions of a mold mounted respectively on said bed and said crown.*

*18. A clamp according to claim 16 wherein each of said power means includes at least one hydraulic piston and cylinder assembly.*

*19. A clamp according to claim 16 further including a power means connected to said frame for pivoting said frame relative to said means revolvably supporting same.*

* * * * *